No. 851,340. PATENTED APR. 23, 1907.
H. P. BROWN.
MEANS FOR BONDING ELECTRIC CONDUCTORS.
APPLICATION FILED FEB. 9, 1905.

4 SHEETS—SHEET 1.

Witnesses:
F. George Barry
Henry Thieme

Inventor:
Harold P. Brown
by attorneys

No. 851,340. PATENTED APR. 23, 1907.
H. P. BROWN.
MEANS FOR BONDING ELECTRIC CONDUCTORS.
APPLICATION FILED FEB. 9, 1905.
4 SHEETS—SHEET 2.
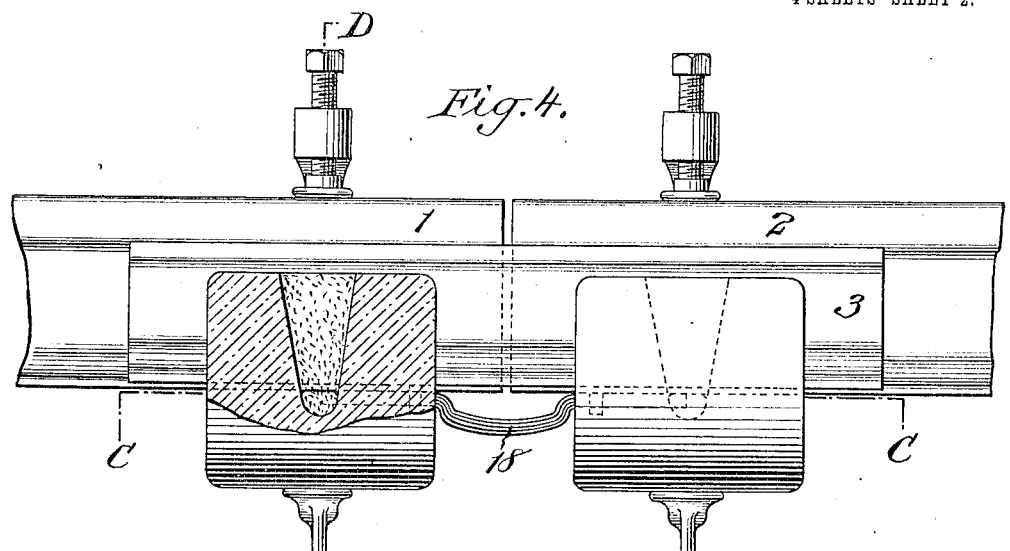
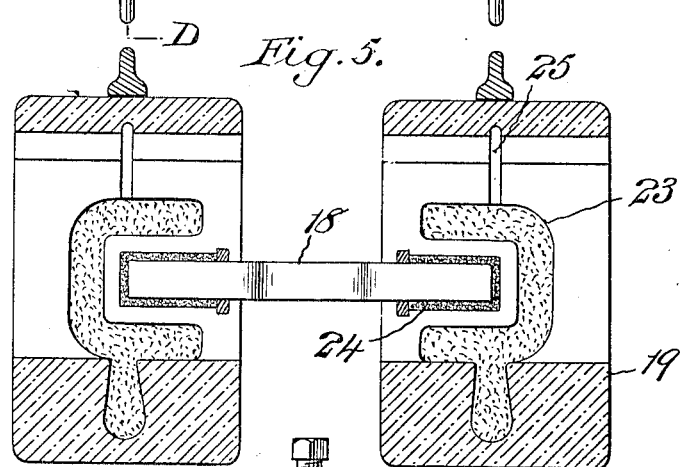
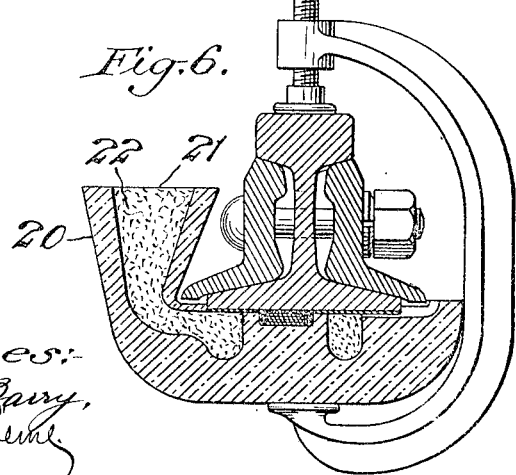
Witnesses:
F. George Barry,
Henry Thiene
Inventor:
Harold P. Brown
by attorneys
Brown & Seward No. 851,340. PATENTED APR. 23, 1907.
H. P. BROWN.
MEANS FOR BONDING ELECTRIC CONDUCTORS.
APPLICATION FILED FEB. 9, 1905.

4 SHEETS—SHEET 3.

Witnesses:-
F. George Barry.
Henry Thiene

Inventor:-
Harold P. Brown
by attorneys
Brown & Seward

No. 851,340.
PATENTED APR. 23, 1907.
H. P. BROWN.
MEANS FOR BONDING ELECTRIC CONDUCTORS.
APPLICATION FILED FEB. 9, 1905.
4 SHEETS—SHEET 4.
Fig. 9.
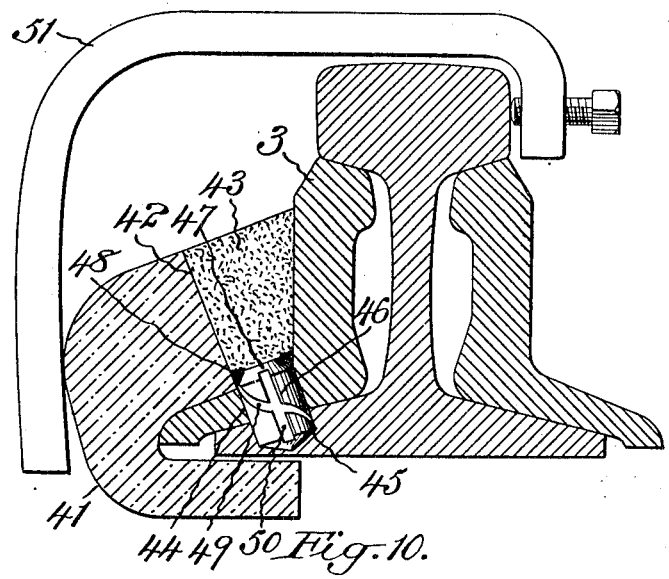
Fig. 10.
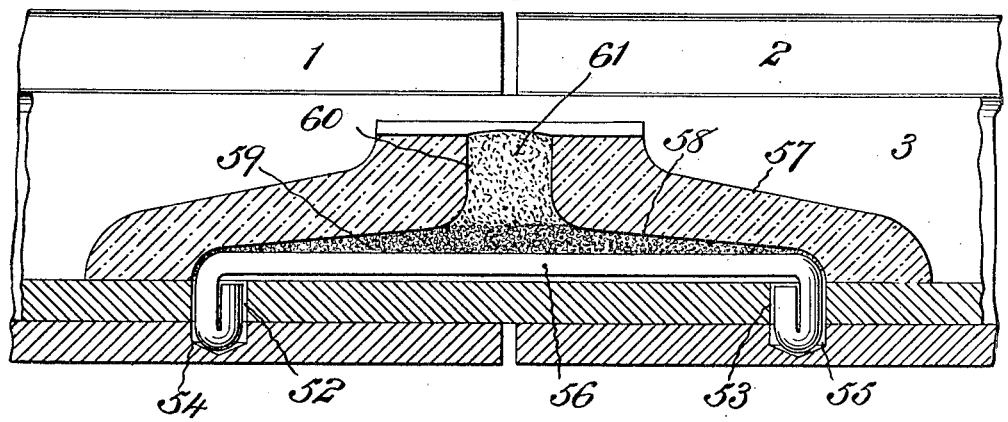
Fig. 11.
Witnesses:
F. George Barry,
Henry Thieme
Inventor:
Harold P. Brown
by attorneys
Brown & Seward

UNITED STATES PATENT OFFICE.

HAROLD P. BROWN, OF MONTCLAIR, NEW JERSEY.

MEANS FOR BONDING ELECTRIC CONDUCTORS.

No. 851,340.  Specification of Letters Patent.  Patented April 23, 1907.

Application filed February 9, 1905. Serial No. 244,836.

*To all whom it may concern:*

Be it known that I, HAROLD P. BROWN, a citizen of the United States, and a resident of Montclair, in the county of Essex and State of New Jersey, have invented a new and useful Means for Bonding Electric Conductors, of which the following is a specification.

My invention relates to means for bonding electric conductors with the object in view of providing bonds which shall be connected firmly with the conductors by connections which shall be durable and of high electric conductivity and which may be made at low cost.

With these ends in view, my invention consists in certain features of construction and combination of parts as will be hereinafter described and pointed out in the claims.

Figure 1:
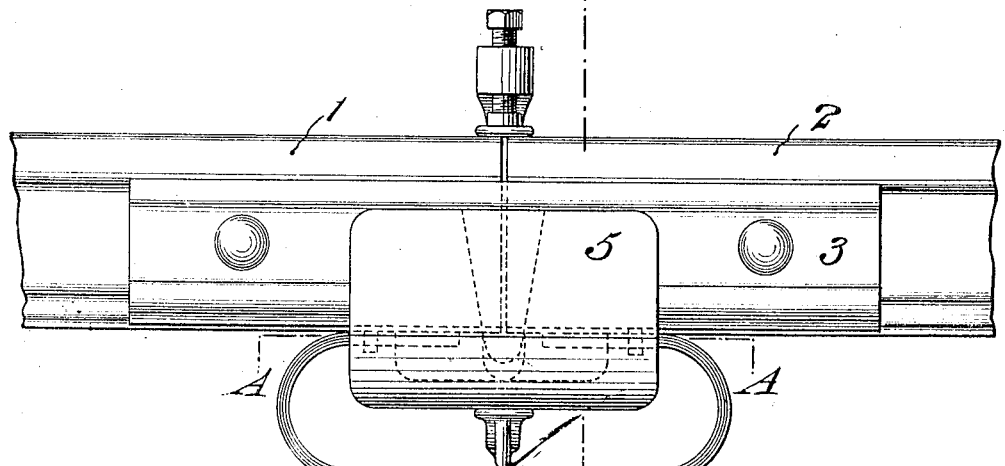
Figure 2:
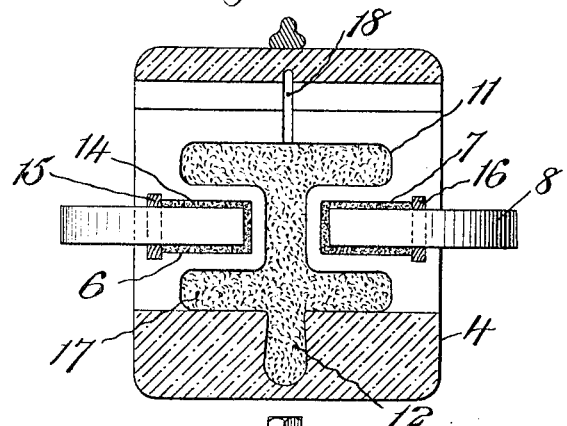
Figure 3:
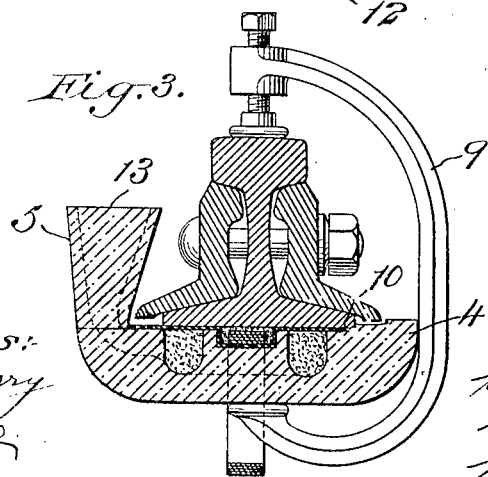
Figure 7:
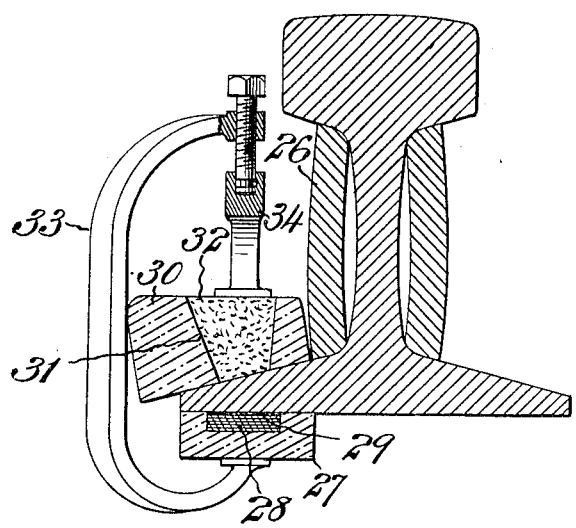
Figure 8:
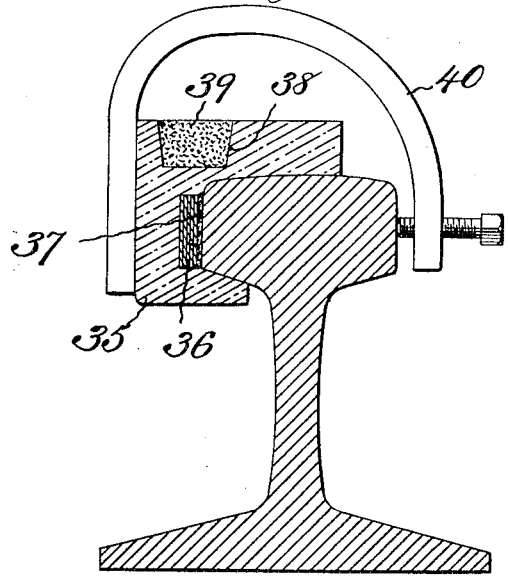

In the accompanying drawings, Figure 1 is a view in side elevation of the meeting ends of two railway rails at the point where they are connected by an angle plate and showing the bonding means in position for making the connections, Fig. 2 is a horizontal section in the plane of the line A—A of Fig. 1, Fig. 3 is a transverse section in the plane of the line B—B of Fig. 1, Fig. 4 is a view in side elevation, partly in section, of the meeting ends of two railway rails showing the angle plate and a modified means of bonding, Fig. 5 is a horizontal section in the plane of the line C—C of Fig. 4, Fig. 6 is a transverse section in the plane of the line D—D of Fig. 4, Fig. 7 is a transverse section through a railway rail provided with a fish plate for splicing the ends of two rails as distinguished from the angle plate shown in the previous figure and showing a modified means of attaching a bond to the rail, Fig. 8 is a transverse section through a railway rail showing another modification of means for bonding, in this instance for attaching the bond to the side of the rail head, Fig. 9 is a transverse section through the rail and angle plates showing the means of bonding by using the angle plate as a part of the bond, Fig. 10 is a vertical longitudinal section through the bases of the meeting ends of two rails taken in a plane at one side of the center and showing means for attaching a bond to the bases of the rails through the angle plate, and Fig. 11 is a transverse section through the bond shown in Fig. 10 at its end which is folded over on itself to enter the hole in the angle plate and base.

The form of electric conductor which I have chosen to illustrate my invention is the railway rail and the several means for bonding are particularly well adapted to the bonding of two consecutive rails although the means of bonding herein described are also well adapted to the bonding of conductors other than railway rails.

Referring to the form represented in Figs. 1 to 3 inclusive, the adjacent ends of the railway rails are denoted by 1 and 2 and the angle plate by 3. A bonding crucible, conveniently made of a general L-shape in cross section, is provided with a base portion 4 for resting with its upper face in proximity to the under side of the base of the rail and with an upright portion 5 which is intended to extend upwardly from the base of the rail for the purpose of providing a feeder or igniting hopper for the bonding crucible. The base 4 of the crucible is provided on its upper face with shallow recesses 6 and 7 opening at its opposite edges and extending inwardly toward one another and terminating a short distance apart for the reception of the opposite ends of a bond 8. The bond 8 is here shown as made of several layers of conducting material, copper, for example, in the form of flat strips, the ends of the strips having been previously united in the well known manner by dipping into some suitable solder. It is intended that the depths of the recesses 6 and 7 shall correspond to the thickness of the bond 8 so that when the crucible is in place with the ends of the bond inserted therein and the crucible is forced upwardly against the base of the rail by a suitable clamp, such, for instance, as the clamp 9, the bonds will be pressed tightly against the under sides of the bases of the rails. This statement, however, should be slightly modified in this respect; viz., that for the purpose of pressing the ends of the bonds toward the bases of the rails to a slight extent when the solder is melted, I prefer to insert between the upper face of the crucible and the lower side of the base of the rail a sheet 10 of asbestos or other suitable non-inflammable and compressible material, which may be depressed into the recesses 6 and 7 to form pockets for the reception of the ends of the bond, as shown in Fig. 3, or cut away opposite the bond recesses as shown in Fig. 6. In the upper face of the part 4 of the crucible there is also formed an H-shaped recess 11, the two parallel parts of the H-shaped recess extending along the sides of the recesses in which the ends of the bond are located and spaced a short distance therefrom while the bar portion of the H-shaped recess which connects the two parallel portions extends between the ends of the bond receiving recesses. The said H-shaped recess is connected by a branch 12 with the feed and igniting hopper 13. It is intended that the recesses 6 and 7 in which the ends of the bond 8 are placed shall be provided with bits of solder 14 and to prevent the solder from creeping along the recesses between the edges of the bond and the wall of the recess to the outside of the crucible, I prefer to insert asbestos dams 15 and 16 in enlarged portions of the recesses 6 and 7 near their outer ends. It is intended that the H-shaped recess 11 as well as a portion or the whole of the hopper 13 shall be filled with a heat producing material which, by chemical reaction when ignited, will raise the parts of the crucible in proximity to the recesses 6 and 7 to such a high degree of heat as will be sufficient to melt the solder and thus solder or braze the ends of the bond 8 to the under sides of the rail bases. The heat producing material 17 may be in the form of a powder and may be composed of pulverized iron oxide or other metallic compounds containing oxygen, sulphur or chlorine, with pulverized aluminum or other similar metals, or other compounds in which chemical reaction produces heat, as, for instance, what is known in the art as "thermit." The crucible is provided with a vent 18 leading from the H-shaped recess 11 to the interior of the crucible preferably on the opposite side from that on which the hopper 13 is located. This particular structure is a simple one and provides for simultaneously connecting the ends of the bond with the bases of adjacent rails; and the loop form of bond also presents advantages over other forms in that the contraction and expansion of the rails or other movements toward and away from each other, do not strain the bond seriously at the points where it is connected but tend to open the loop at a considerable distance away from the points where it is connected and so distribute this tendency to open the loop as to require very little change in its shape at any one place. The crucible may be of cast iron or of some suitable refractory material; preferably cast iron, and it may be removed after the soldering has taken place by loosening the clamp.

In the form shown in Figs. 4, 5 and 6, the bond 18, made up of several strips of conducting material in a similar manner to the bond 8 hereinbefore described, has its ends connected with the lower sides of the bases of the meeting ends of the rails 1 and 2 by means of separate bonding crucibles, one for each end of the bond, the said crucibles being made symmetrical and consisting of a base portion 19 and upright portion 20, the latter being provided with a hopper 21 for the reception of the heat producing material 22 which, as in the former case, may be "thermit" or any other material which, by chemical reaction, will produce heat high enough for soldering or brazing purposes. In this form each mold is provided with a U-shaped recess 23 in communication with the hopper 21 for the reception of the heat producing material, the said U-shaped recess 23 being arranged to surround the recess 24 in the face of the base portion 19 of the crucible in which the end of the bond 18 is received. Each of these crucibles is also provided with an outlet 25 and the operation of bonding is quite similar to that hereinabove described with the exception that it requires two operations instead of one to connect the bond with the bases of the rails.

In the form shown in Fig. 7 the rails are shown as mechanically connected by means of fish plates 26 instead of angle plates as in the previous figures and in this form the bonding crucible is made sectional, one part 27 being provided with a recess 28 in its face for the reception of the end of the bond 29, while another section 30 of the crucible is adapted to be placed on top of the base of the railway rail and is provided with a chamber 31 for the reception of the heat producing material 32, the bottom of the chamber 31 being exposed to the top of the rail base and the heat produced by the chemical reaction, when the material 32 is ignited, is sufficient to heat the rail base to a degree high enough to melt the solder interposed between the bond 29 and the under side of the base of the rail. In this instance the two sections 27 and 30 of the crucible may be held in position by a single clamp 33, the said clamp having its upper jaw 34 bifurcated to straddle the chamber 31.

In the form shown in Fig. 8, the bonding crucible 35 may be of a single piece and so shaped as to conform to the top, side and a portion of under side of the head of the rail, the said crucible being provided with a recess 36 on its face toward the side of the head of the rail for the reception of the bond 37, and also provided with a chamber 38 in its top which projects downwardly to a point near the head of the rail and near the recess 36 for the reception of heat producing material 39. A single clamp 40 serves to hold the bonding crucible in position.

In the form shown in Fig. 9, the bonding crucible, denoted by 41, is made to conform to the front and base of the angle plat 3 and is provided with a chamber 42 for the reception of the heat producing material 43. The chamber 42 may consist simply of a recess in the face of the mold, the angle plate 3 forming one of the walls of the chamber so that the heat producing material 43 may be brought into intimate contact with the angle plate and serve to raise its temperature to a soldering or brazing point. In this form the bonding is accomplished by means of two plugs which extend through holes 44 in the angle plate and into sockets 45 in the top of the rail base, it being understood that there is another plug like the plug 46 shown in Fig. 9 to unite the angle plate 3 with the adjacent rail. In this form the chamber 42 opens at its bottom directly onto the top of the plug 46, the extreme upper end of the plug 46 being made taper, as shown at 47, for the purpose of leaving an annular V-shaped groove around it for the reception of solder 48 which, when melted by heat from the material 43 will flow along channels 49 and 50, the one 49 being made winding on the face of the plug and the other straight from top to bottom along its face. This seals the plug tightly to the angle plate and base, and the crucible may be held in position for operation by means of a single clamp 51.

In the form shown in Figs. 10 and 11, the angle plate 3 is provided, as in the previous instance, with holes 52 and 53 through it, registering with sockets 54 and 55 in the bases of the rails 1 and 2 and the plugs, instead of being made independently, are formed at the opposite ends of a continuous bond 56. The bond 56 may be made of half round copper and its opposite ends may be folded over to bring the flat faces in proximity so as to form a substantially round plug and at the same time leaving space enough between its exterior and the wall of the hole and socket and between the meeting flat faces of the doubled portions to receive the melted solder. To connect this bend with the rails, a single bonding crucible 57 may be employed and fitted to the top of the angle plate in a manner quite similar to that shown in Fig. 9, the chamber 58 being extended along the length of the bond 56 to receive solder 59 and a single upright extension 60 of the chamber may be provided with the heat producing material 61 for melting the solder and causing it to fill the holes and sockets in which the opposite ends of the bond 56 are inserted.

The forms herein particularly illustrated are but few of the many varieties which will readily occur to one practically engaged in bonding conductors but they all show means for employing the heat resulting from chemical reaction to raise the parts at the points where they are to be united to a temperature sufficiently high for soldering or brazing purposes and sufficiently high to melt the solder to effect the soldering or brazing. This provides for a very quick and effective operation, saving the great expenditure of time which has heretofore been common in applying heat in the form of flame to the parts to be brazed or soldered.

What I claim is:—

1. In a bonding apparatus, a bonding crucible provided with a recess for the reception of the brazing material and that portion of the bond which is to be brazed or soldered and a chamber near the said recess for the reception of a body of chemically reacting, non-gaseous heat producing material.

2. In a bonding apparatus, a bonding crucible provided with a recess for the reception of the brazing material and that portion of the bond which is to be brazed or soldered, and a chamber near the said recess for the reception of a body of chemically reacting, non-gaseous heat producing material, and means for holding the conductors to which the bond is to be attached in contact with the said parts, as set forth.

3. In a bonding apparatus, a bonding crucible provided with a recess for the reception of the brazing material and that portion of the bond which is to be brazed or soldered, a chamber near the said recess for the reception of a body of chemically reacting, non-gaseous heat producing material and a feeder or charging hopper in communication with the said chamber.

4. In a bonding-apparatus, a bonding crucible provided with a recess for the reception of the brazing material and that portion of the bond which is to be brazed or soldered, a chamber near the said recess for the reception of a body of chemically reacting, non-gaseous heat producing material and a vent leading from said chamber.

5. In a bonding apparatus, a bonding crucible provided with a plurality of recesses for the reception of the brazing material and portions of the bond which are to be brazed or soldered and a chamber near the said recesses for the reception of a body of chemically reacting, non-gaseous heat producing material.

In testimony, that I claim the foregoing as my invention, I have signed my name in presence of two witnesses, this 30th day of January 1905.

HAROLD P. BROWN.

Witnesses:
  FREDK. HAYNES,
  C. S. SUNDGREN.